United States Patent
Chinnaswami

(10) Patent No.: US 6,449,475 B1
(45) Date of Patent: Sep. 10, 2002

(54) SYSTEM AND METHOD FOR MATCHING CALLS TO ELECTRONIC PHONEBOOK ENTRIES

(75) Inventor: Karthick Chinnaswami, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/469,059

(22) Filed: Dec. 20, 1999

(51) Int. Cl.$^7$ .............................. H04M 3/42; H04M 1/56
(52) U.S. Cl. .................... 455/415; 455/414; 379/142.06
(58) Field of Search .................................. 455/415, 414, 455/418, 567; 379/88.19, 88.2, 142.01, 142.06

(56) References Cited

U.S. PATENT DOCUMENTS

| | | |
|---|---|---|
| 5,528,680 A | 6/1996 | Karpicke |
| 5,546,447 A | 8/1996 | Skarbo et al. |
| 5,883,942 A | 3/1999 | Lim et al. |
| 6,137,871 A * | 10/2000 | Maier et al. ........... 379/142.06 |
| 6,169,799 B1 * | 1/2001 | McIntosh ............... 379/355.01 |
| 6,324,272 B1 * | 11/2001 | Abu-Shukhaidem et al. .... 379/142.06 |

\* cited by examiner

*Primary Examiner*—Edward F. Urban
*Assistant Examiner*—Erika A. Gary
(74) *Attorney, Agent, or Firm*—Philip R. Wadsworth; Charles D. Brown; Howard H. Seo

(57) ABSTRACT

A system (36, 38) for accurately matching a phone call to a corresponding entry in an electronic phonebook (40) adapted for use with a telephone (10). The system (36, 38) includes a first mechanism (38) for identifying the phone call and providing a phone number in response thereto. A second mechanism (38) determines a home area code associated with the phone. A third mechanism (38) employs the home area code and the phone number to accurately match the phone call to a corresponding entry in the electronic phonebook (40) whether or not entries in the electronic phonebook (40) contain area codes. In a specific embodiment, the first mechanism (38) includes a mechanism (38) for identifying the phone call as an incoming or outgoing call. A caller identification system (38) identifies incoming calls and provides the phone number in response thereto. Another mechanism (38) stores an outgoing number dialed by the user and provides the outgoing number as the phone number in response thereto. The area code of the wireless phone (10) is stored in on a computer (36). The third mechanism (38) prepends digits, based on the area code, to the phone number if the phone number is seven digits in length and provides an adjusted number in response thereto. The third mechanism (38) includes another mechanism (38) for adjusting entries in the electronic phonebook (40) that have only seven digits by prepending the digits based on the area code to the seven-digit phonebook entries and providing adjusted entries in response thereto. An additional mechanism (38) compares the adjusted number to entries in the electronic phonebook (36) including the adjusted entries and provides a match signal in response thereto as an output of the third mechanism (38) if the adjusted number matches an entry in the electronic phonebook (40).

5 Claims, 2 Drawing Sheets

SYSTEM AND METHOD FOR MATCHING CALLS TO ELECTRONIC PHONEBOOK ENTRIES

BACKGROUND OF THE INVENTION

1. Field of Invention

This invention relates to telecommunications systems. Specifically, the present invention relates to systems and methods for matching incoming and or outgoing calls to electronic phonebook entries in a wireless phone or other communications device.

2. Description of the Related Art

Wireless phones are employed in a variety of demanding applications ranging from search and rescue to business applications. Such applications demand feature-rich wireless phones for efficiently placing and receiving incoming and outgoing calls.

As wireless phone technology advances, the demand for more features increases. Existing wireless phones typically include a computer for running software such as phonebook software to improve phone functionality. Much software, currently under development and already developed, requires accurate matching of incoming and outgoing calls to appropriate entries in the electronic phonebook. For example, call record keeping software for tracking incoming calls to or outgoing calls from parties listed in the electronic phonebook and caller identification software for notifying a user when an incoming call matches an entry in the electronic phonebook both require accurate matching of incoming and or outgoing calls to entries in the phonebook.

Currently, systems and methods for matching incoming or outgoing calls to entries in an electronic phonebook rely on exact matches between dialed numbers or incoming caller identification numbers to corresponding entries in the electronic phonebook. Unfortunately, such methods often fail to accurately match incoming and outgoing calls to appropriate entries in the electronic phonebook. For example, if a user is operating in the 619 area code and dials a seven-digit number, the dialed phone number may not match a corresponding ten-digit entry in the electronic phonebook that includes the 619 area code. Similarly, if a user enters a seven-digit number in the electronic phonebook rather than a ten-digit number, the seven-digit phonebook entry may incorrectly match a received call from a different area code but with similar last seven digits.

Hence, a need exists in the art for a system and method for accurately matching incoming and outgoing calls with corresponding entries in an electronic phonebook that avoids inadvertent errors resulting from mismatched area codes.

SUMMARY OF THE INVENTION

The need in the art is addressed by the system for accurately matching a phone call to a corresponding entry in an electronic phonebook of the present invention. In the illustrative embodiment, the inventive adapted for use with a wireless phone and includes a first mechanism for identifying the phone call and providing a phone number in response thereto. A second mechanism determines a home area code associated with the phone. A third mechanism employs the home area code and at least a portion of the phone number to accurately match the phone call to a corresponding entry in the electronic phonebook whether or not entries in the electronic phonebook contain area codes.

In a specific embodiment, the first mechanism includes a mechanism for identifying the phone call as an incoming or outgoing call. A caller identification system identifies incoming calls and provides the phone number in response thereto. Another mechanism stores an outgoing number dialed by the user and provides the outgoing number as the phone number in response thereto.

The area code of the wireless phone is stored in memory. The third mechanism prepends digits based on the area code to the phone number if the phone number is seven digits in length and provides an adjusted number in response thereto. The third mechanism includes another mechanism for adjusting entries in the electronic phonebook that have only seven digits by prepending the digits based on the area code to the seven-digit phonebook entries and providing adjusted entries in response thereto. An additional mechanism compares the adjusted number to entries in the electronic phonebook including the adjusted entries and provides a match signal in response thereto as an output of the third mechanism if the adjusted number matches an entry in the electronic phonebook.

The novel design of the present invention is facilitated by the third mechanism, which eliminates matching errors due to the lack of area code information associated with 7-digit phone numbers in the electronic address book and 7-digit dialed numbers by appending appropriate area code information to the 7-digit numbers prior to comparisons that match the incoming an outgoing numbers to entries in the electronic phonebook.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
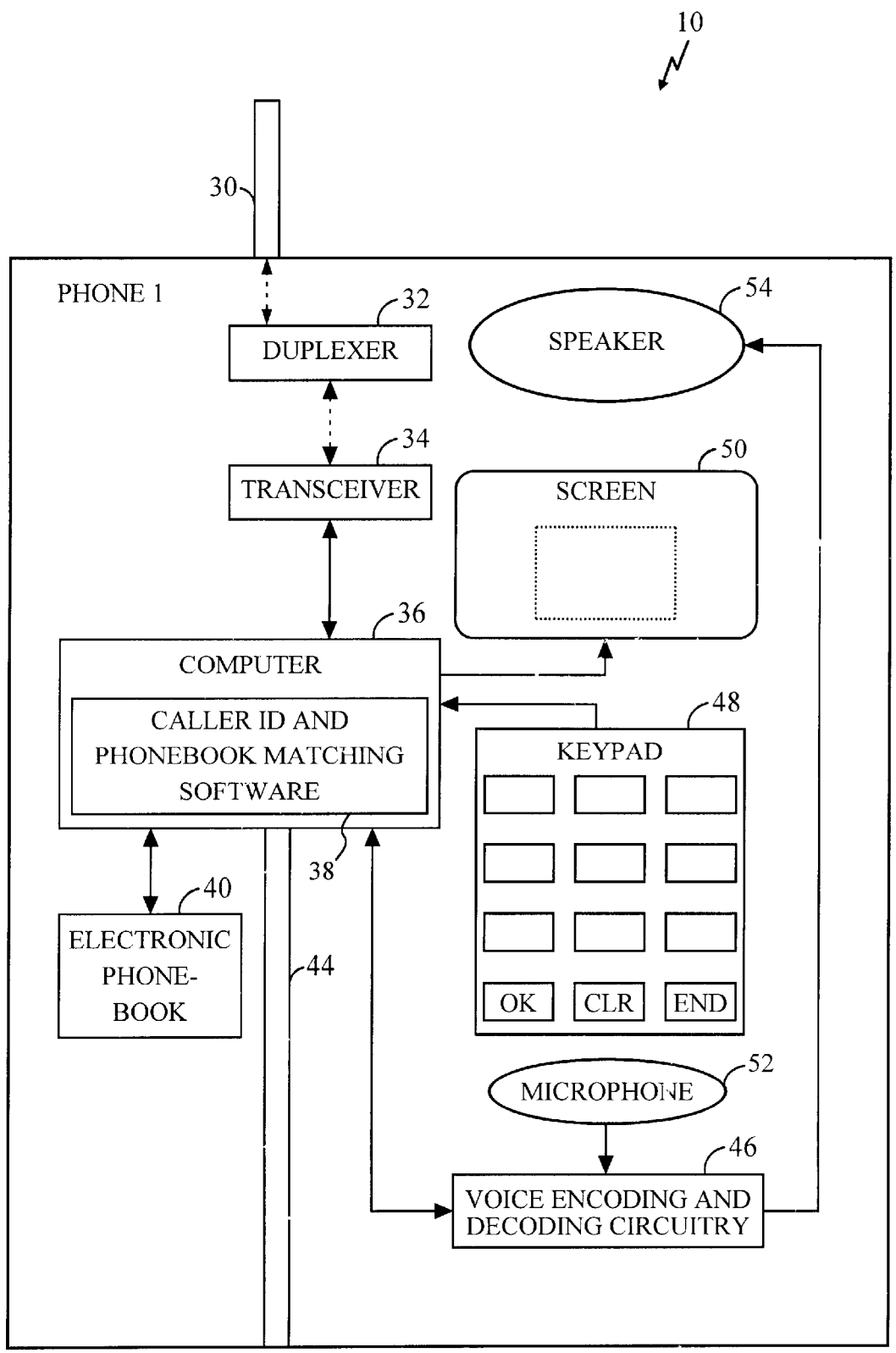
FIG. 1 is a diagram of a wireless phone constructed in accordance with the teachings of the present invention.

FIG. 1 is a diagram of a wireless phone 10 constructed in accordance with the teachings of the present invention. The wireless phone 10 includes an antenna 30 that is -connected to a duplexer 32. The duplexer 32 is connected to a transceiver 34, which is connected to a computer 36 running caller ID and phonebook matching software 38 constructed in accordance with the teachings of the present invention. The computer 36 is has access to an electronic phonebook 40. The computer 36 is also connected to a data interface adapter 44, voice-encoding/decoding circuitry 46, a keypad 48, and a screen 50. The voice-encoding/decoding circuitry 46 is connected to a microphone 52 and a speaker 54. For clarity, additional circuitry such as clocking circuitry and power supplies are not shown in the wireless phone 10, but those ordinarily skilled in the art will know where and how to include the requisite additional circuitry. Also for clarity, the electronic phonebook 40 is shown separately from the computer 36, but in practice, the electronic phonebook 40 is preferably implemented in software and stored in computer memory (not shown).

In operation, the antenna 30 transmits and receives signals via the duplexer 32. The duplexer 32 facilitates sharing of resources of the antenna 30 between transmit and receive functions. The transceiver 34 includes transmit circuitry for transmitting signals such as encoded voice signals or service negotiation signals via the antenna 30 and duplexer 32. The transceiver 34 also includes receive circuitry for receiving signals, such as service negotiation messages or encoded voice signals, from another phone, base station, or mobile switching center (not shown) via the wireless network 18. The transceiver 34 also includes downconversion circuitry required to convert receive signals to digital baseband signals in preparation for processing via the computer 36. In addition, the transceiver 34 includes upconversion circuitry required to convert transmit signals from digital baseband signals to radio frequency signals in preparation for transmission via the antenna 30.

A user may initiate a call by dialing a number via the keypad 48. The computer 36 negotiates a service connection with an available wireless service provider associated with the wireless network via the transceiver 34, the duplexer 32, and the antenna 30. When service is established, voice, data or fax information is transferred over the air interface link. For a voice call, the user's voice is input to the microphone 52, encoded by the voice-encoding/decoding circuitry 46 and transmitted via the computer 36, transceiver 34, duplexer 32, and the antenna 30. Similarly, received voice messages are decoded by the voice-encoding decoding circuitry 46 and as voice via the speaker 54. The data interface adapter 44 allows software running on the computer 36 to be upgraded and/or changed. The data interface adapter 44 also facilitates employing the wireless phone 10 as an external modem for an external computer (not shown). In this case, modem software runs on the computer 36 and or on the external computer and facilitates communications with the external computer. Such modem software is known in the art and may be developed or purchased by one ordinarily skilled in the art.

In the present embodiment, the computer 36 runs the unique phonebook matching software 38, which is constructed in accordance with the teachings of the present invention. The unique phonebook matching software 38 monitors the wireless phone 10 for the dialing of an outgoing call or the receipt of an incoming call and matches the associated phone number with an entry in the electronic phonebook 40 if a matching entry exists. The phone book matching software 38 also includes caller ID software (not shown) which is known in the art.

The novel phonebook matching software 38 of the present invention overcomes errors associated with non-accounted for area code information by inserting the area code associated with the wireless phone 10 at the beginning of an outgoing phone number to yield a ten digit number for comparison purposes. The resulting 10-digit number is compared to 10-digit phone number entries in the electronic phonebook 40. Prior to comparison between entries in the electronic phonebook 40 and the 10-digit outgoing number, all 7-digit numbers in the electronic phonebook 40 are converted to 10-digit numbers by inserting the area code (home area code) of the wireless phone 10 at the beginning of the 7-digit numbers. The area code of the wireless phone 10 is predetermined and is stored in memory such as the electronic phonebook 40. Similarly, prior to comparison between 10-digit incoming numbers and entries of the electronic phonebook 40, all 7-digit numbers in the electronic phonebook 40 are converted to 10-digit numbers by prepending the area code (home area code) of the wireless phone 10.

Conventional phonebook matching systems indicate matches between all 7-digit phonebook entries and 10-digit incoming or outgoing phone numbers whose last 7 digits match the 7-digit phonebook entry, often resulting in incorrect phonebook matches. Similarly, conventional systems indicate matches between 7-digit outgoing numbers that match the last 7 digits of a 10-digit phonebook entry, often resulting in incorrect phonebook matches. These inaccuracies are addressed by the unique software 38 and associated wireless phone 10 of the present invention as discussed more fully below.

The unique system of the present invention for facilitating matching incoming phone calls to entries in a phonebook is particularly effective in systems employing voice-recognition to handling incoming call-waiting calls and associated signals. A system for efficiently handling incoming call-waiting calls suitable for use with the present invention is disclosed in U.S. patent application Ser. No. 09/469,060, filed Dec. 20, 1999, by S. Hafiz, entitled SYSTEM AND METHOD FOR ENHANCING CALL-WAITING FUNCTIONALITY VIA VOICE RECOGNITION, assigned to the assignee of the present invention and incorporated by reference herein.

Figure 2:
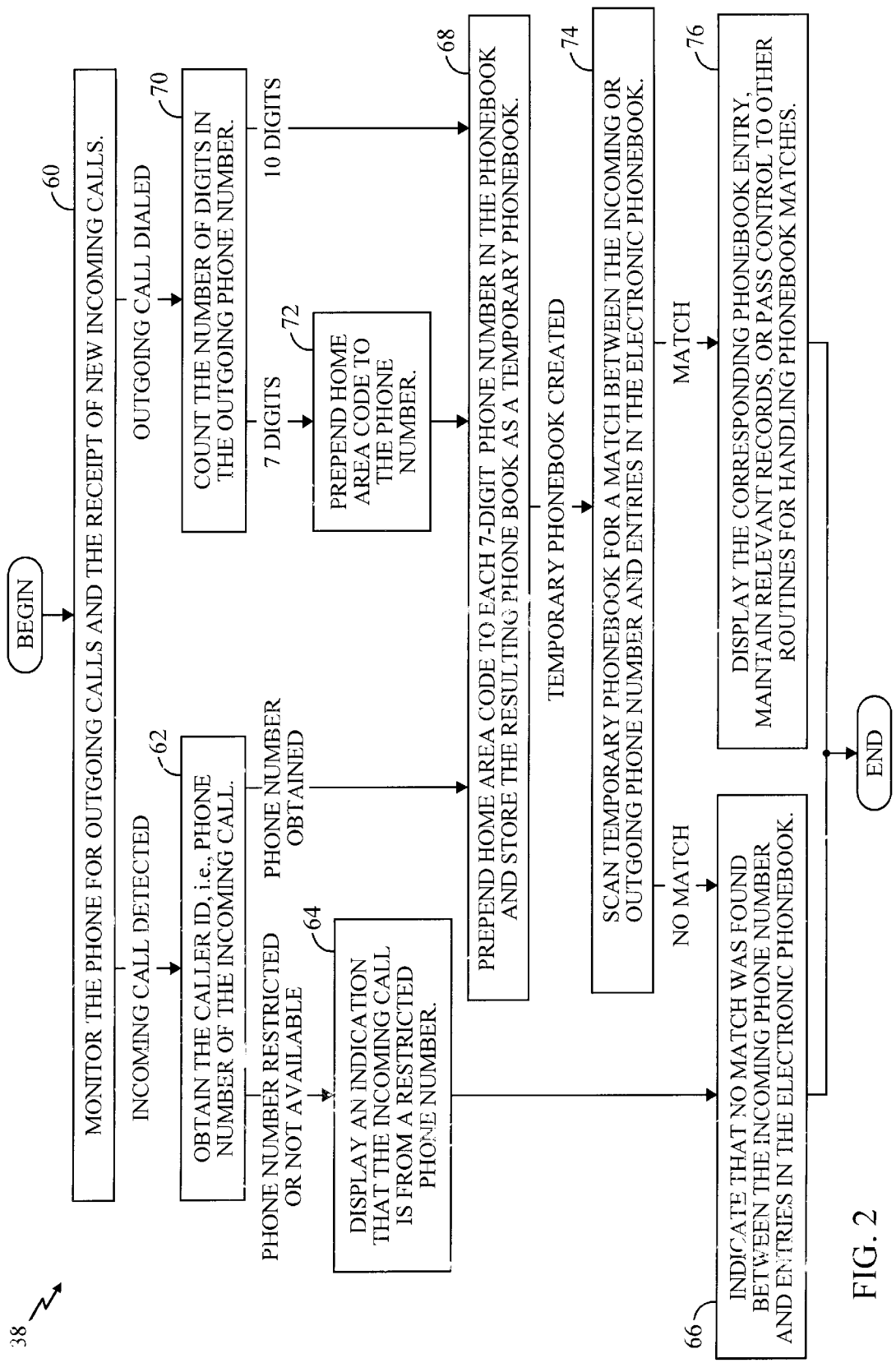
FIG. 2 is a flow diagram of software for efficiently matching incoming and outgoing calls to entries in an electronic phonebook running on the phone computer of FIG. 1.

FIG. 2 is a flow diagram of the software 38 of FIG. 1 for efficiently matching incoming and outgoing calls to entries in the electronic phonebook 40 FIG. 1. With reference to FIGS. 1 and 2, in an initial monitoring mechanism 60, the software 38 monitors the wireless phone 10 for dialed outgoing calls and for the receipt of incoming calls. The incoming calls may be standard incoming calls, call-waiting calls, or another type of incoming call without departing from the scope of the present invention.

If an incoming call is received by the wireless phone 10 and a user answers the incoming call, then control is passed to a caller ID mechanism 62, where the phone number of the incoming call is determined, if available and not restricted, via caller identification systems and methods known in the art. Requisite caller-ID functionality is embedded in the software 38. The caller ID functionality is known in the art and easily developed or ordered and incorporated into the software 38 or other hardware (not shown) of the wireless phone 10. Those skilled in the art will appreciate that for caller ID systems to work properly, caller ID must supported by a network with which the wireless phone 10 communicates. The present invention is adapted for use with caller ID systems that provide 10-digit phone numbers, however the present invention may be easily adapted for use with other lengths of numbers provided by caller ID systems, such as different length international numbers, without departing from the scope of the present invention.

If in the caller ID mechanism 62 the software 38 determines that the incoming number is a restricted number or is otherwise not available, then control is passed to a first indication mechanism 64, where the software 38 indicates, via the display screen 50, that the incoming call is from a restricted number. An exemplary displayed message is "Incoming call from restricted number." After the first display mechanism 64, control is passed to a no-match mechanism 66, where the software 38 returns that no match was found between the incoming call and entries in the electronic phonebook 40. Alternatively, a special entry for non-matching calls may be created in the electronic phonebook 40 and restricted calls or otherwise non-matching calls may be considered to match with the non-matching call category.

If the caller ID mechanism 62 successfully obtains the phone number associated with the received call, then control is passed to a first prepending mechanism 68 where the home area code of the wireless phone 10 is prepended to each 7-digit phone number entry resulting in a temporary phonebook entry of 10 digits which is then compared to the incoming number for a match. The home area code of the wireless phone 10 is stored in phone computer memory or is retrievable from memory of an associated telecommunications network (not shown). Alternatively, the temporary phonebook may be implemented as a permanent phonebook stored in a memory of the computer 36.

If the monitoring mechanism determines that an outgoing call has been dialed, then control is passed to a counting mechanism 70, where the number of digits in the outgoing phone number are counted. If the outgoing number is a 7-digit number, then control is passed to a second prepending mechanism 72, where the home area code of the wireless phone 10 is prepended to the outgoing number for comparison purposes. After the second prepending mechanism 72, control is passed to the first prepending mechanism 68. If the outgoing number is a 10-digit number, then control is passed directly to the first prepending mechanism 68.

The mechanisms 62 and 70 comprise a mechanism for identifying a phone number corresponding to an incoming or outgoing phone call, respectively, and providing phone number in response thereto for use by subsequent mechanisms of the software 38 as discussed more fully below.

Once the temporary phonebook of ten-digit numbers is created by the first prepending mechanism 68 then control is passed to a scanning mechanism 74, where the temporary phonebook is searched for entries in the temporary phonebook that match the outgoing number, which is adjusted to a 10-digit number if not already a 10-digit number by the second prepending mechanism 72, or the 10-digit incoming number. If a match is found, control is passed to a match mechanism 76, where the software 38 returns a match indication for use by other routines or software, such as call record keeping software, for handling phonebook matches. If no match is found, then control is passed to the no-match mechanism 66. Once the no match mechanism 66 or the match mechanism 76 is complete, the software 38 is complete.

The exact programming details required to implement the software 38 of FIG. 2 may be easily developed by one ordinarily skilled in the art having access to the present teachings.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A system for accurately matching a phone call to a corresponding entry in an electronic phonebook comprising:

first means for identifying a phone number corresponding to said phone call and providing said phone number in response thereto;

second means for determining a home area code; and third means for employing said home area code and at least a portion of said phone number to accurately match said phone call to a corresponding entry in said electronic phonebook whether or not entries in said electronic phonebook contain area codes, wherein:

said first means includes means for identifying said phone call as an incoming or outgoing call;

said third means includes means for prepending digits based on said area code to said phone number if said phone number is seven digits in length and providing an adjusted number in response thereto;

said third means includes means for adjusting entries in said electronic phonebook that have only seven digits by prepending said digits based on said area code to said seven-digit phonebook entries and providing adjusted entries in response thereto; and said third means includes means for comparing said adjusted number to entries in said electronic phonebook including said adjusted entries and providing a match signal in response thereto as an output of said third means if said adjusted number matches an entry in said electronic phonebook.

2. The system of claim 1 wherein said first means includes a caller identification system for identifying incoming calls and providing said phone number in response thereto.

3. The system of claim 1 wherein said first means includes means for storing an outgoing number dialed by a user and providing said outgoing number as said phone number in response thereto.

4. The system of claim 1 wherein said second means includes a computer for storing said area code of a wireless phone associated with said electronic phonebook.

5. A method for accurately matching a phone call to a corresponding entry in an electronic phonebook comprising the steps of:

identifying said phone call and providing a phone number in response thereto;

determining a home area code;

employing said home area code and at least a portion of said phone number to accurately match said phone call to a corresponding entry in said electronic phonebook whether or not entries in said electronic phonebook contain area codes;

identifying said phone call as an incoming or outgoing call;

prepending digits based on said area code to said phone number if said phone number is seven digits in length and providing an adjusted number in response thereto;

adjusting entries in said electronic phonebook that have only seven digits by prepending said digits based on said area code to said seven-digit phonebook entries and providing adjusted entries in response thereto; and comparing said adjusted number to entries in said electronic phonebook including said adjusted entries and providing a match signal in response thereto as an output of said third means if said adjusted number matches an entry in said electronic phonebook.

\* \* \* \* \*